United States Patent
Laigo

[11] 3,738,255
[45] June 12, 1973

[54] BROILER

[76] Inventor: Ben M. Laigo, 1217 Pine St., Seattle, Wash.

[22] Filed: Sept. 16, 1970

[21] Appl. No.: 72,662

[52] U.S. Cl. ................................ 99/450, 99/447
[51] Int. Cl. ......................................... A47j 37/06
[58] Field of Search .................... 99/450, 448–449, 99/446–447, 445, 372, 375, 376, 377, 393, 400, 408, 410; 126/30; 211/14, 181; 248/125, 188.2, 237, 302

[56] References Cited
UNITED STATES PATENTS

| | | | |
|---|---|---|---|
| 3,330,204 | 7/1967 | Little | 99/340 X |
| 2,066,749 | 1/1937 | Trank | 99/402 |
| 1,718,624 | 6/1929 | Baker | 99/450 |
| 3,050,073 | 8/1962 | McMillan | 211/181 X |
| 842,695 | 1/1907 | Peters | 99/445 |
| 3,252,407 | 5/1966 | Buerki | 99/446 |
| 1,630,471 | 5/1927 | Collins | 99/450 |
| 3,207,059 | 9/1965 | Hirons | 99/450 X |
| 1,091,517 | 3/1914 | Knowles | 99/340 UX |
| 1,244,965 | 10/1917 | Durgarian | 99/425 X |

FOREIGN PATENTS OR APPLICATIONS

| | | | |
|---|---|---|---|
| 23,826 | 2/1904 | Sweden | 99/450 |
| 216,656 | 1/1942 | Switzerland | 99/450 |
| 666,213 | 5/1929 | France | 99/450 |

Primary Examiner—William I. Price
Assistant Examiner—Arthur O. Henderson
Attorney—Seed, Berry and Dowrey

[57] ABSTRACT

Food supporting metal rods are held together by a frame with the rods resting directly on a griddle or the like. The food is thus heated directly by conduction so that distinct scoring occurs. The scoring may be in the form of a unique pattern, such as circles, letters or the like, for the purpose of placing a distinctive brand on the food and enhancing its appearance. The rods are spaced sufficiently to allow juices from the food to drip on the griddle so that the smoke may rise and flavor the food.

5 Claims, 4 Drawing Figures

PATENTED JUN 12 1973 3,738,255
FIG. 1
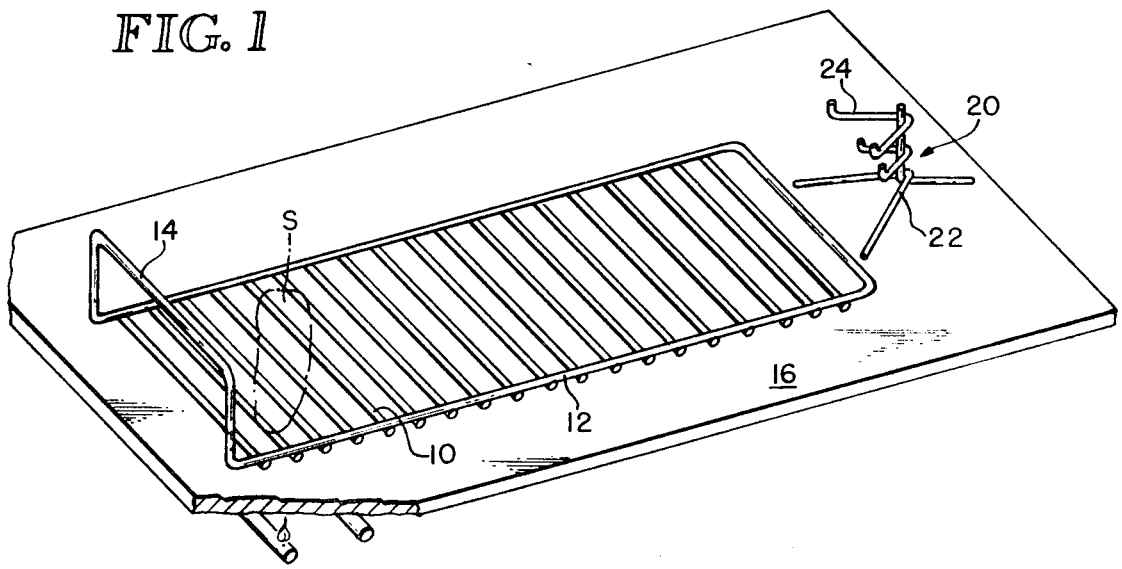
FIG. 2
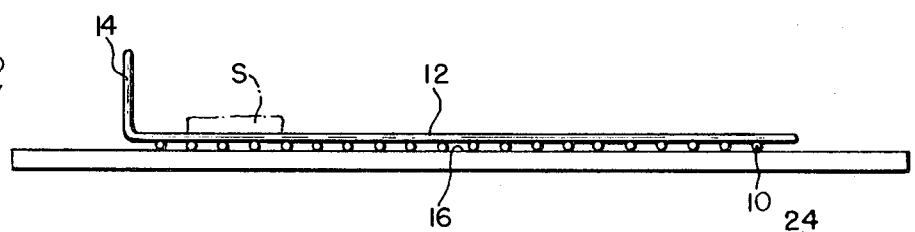
FIG. 3
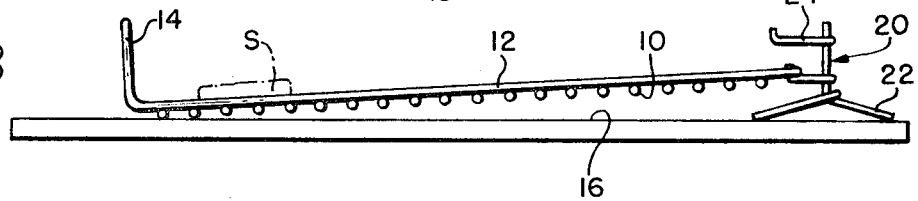
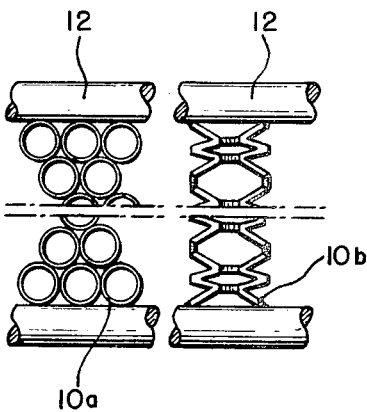
FIG. 4
INVENTOR.
BEN M. LAIGO
BY
ATTORNEYS

BROILER

BACKGROUND OF THE INVENTION

1. Field of the Invention

This invention pertains to broilers for meat, fish, or the like and, more particularly, to attachments for use on a conventional griddle.

2. Description of the Prior Art

Heretofore, restaurants, catering companies, and homes have required the need of separate broiler units, in addition to a griddle, so that broiled foods could be prepared. In the case of commercial food preparation such as by restaurants and catering companies where large groups were being cooked for, several broilers had to be employed, oftentimes with the griddle remaining idle.

Fine restaurants and catering companies, in achieving excellence in the preparation of broiled foods, such as steaks or sea foods, have attempted to score the food to enhance its appearance while also assuring that the food was cooked exactly to the customer's order, that is, well-done, rare, etc. Generally the scoring appeared as parallel lines and, if a more distinctive pattern was desired, the food was sometimes lifted and rotated 180° so that a criss-cross scoring pattern was obtained.

SUMMARY OF THE INVENTION

It is a primary object of this invention to provide a broiler which is used in combination with a conventional griddle of the type found in restaurants and catering kitchens. The broiler could be used, obviously, as well in the home.

Another object of the invention is to provide a broiler which is inexpensive to manufacture and easy to clean and maintain.

Another object of the invention is to provide a broiler on which the rate of cooking may be varied.

Still another object of this invention is to provide a broiler which employs distinctive patterns of heat conductive, food supporting means to achieve distinctive scoring or branding patterns on the food being cooked.

Basically, the invention employs food supporting means held together by a frame with the food supporting means adapted to rest directly on a conventional griddle surface so that the food can be heated directly by conduction to obtain a scoring pattern on the meat even though the food is to be cooked only slightly, such as with a "rare" steak. In the preferred form, an elevating rack is used so that once the desired scoring is obtained the food supporting means may be elevated to obtain a slower cooking rate.

In order to obtain distinctive scoring patterns or branding, the food supporting means may be formed in various shapes, such as circles, letters, or the like.

BRIEF DESCRIPTION OF THE DRAWINGS

FIG. 1 is a perspective view of a broiler embodying the principles of the invention and illustrating, in addition, an elevating rack for adjusting the height of the broiler.

FIG. 2 is a front elevation of the broiler shown in FIG. 1.

FIG. 3 is a front elevation of the broiler shown in FIG. 1 with the broiler elevated.

FIG. 4 illustrates fragmentary plans of various patterns of food supporting structures to be used with the broiler shown in FIG. 1 and to obtain distinctive scoring patterns or branding on the food being cooked.

DESCRIPTION OF THE PREFERRED EMBODIMENTS

The broiler employs a plurality of spaced, elongated rods or food supporting means 10 of a heat conducting material, such as steel. The steel is preferably chromium plated for ease of cleaning and to preclude food particles remaining on the rods which may otherwise impart undesired flavoring to the food being cooked. The rods are held as an integral unit by an elongated frame 12 secured to the top surfaces of the rods. One end of the frame is provided with an upstanding handle 14 for positioning or carrying the broiler. The broiler is intended to be rested directly on a smooth grill or griddle 16, the temperature of which may be regulated by conventional heating elements. As best shown in FIG. 1, food such as a steak S is positioned on the rods and is cooked simultaneously from the griddle by conduction through the rods and radiation and convection between the openings in the rods.

It is important that the rods be adapted to be placed directly on the griddle so that the rods are hotter than the temperature around the food. In this manner, scoring of the food in distinct patterns may be achieved even though the food is to be cooked for only a short period of time such as to satisfy a customer's order for "rare" cooked food. If the rods are not in contact with the griddle, scoring cannot be obtained and consequently the appearance of the food is affected. In order to allow cooked foods to remain hot or to obtain a slower cooking rate once scoring is achieved, an elevating rack 20 is provided. The rack has a base 22 and a plurality of arms 24 at different vertical elevations. In use, the end of the broiler opposite the handle 14 is raised and supported by one of the arms. This spaces the rods from the griddle, the spacing determining the cooking rate of the food.

Regardless of whether a slow cooking rate is obtained by use of the elevating rack or a fast cooking rate is obtained with the rods directly on the griddle, the openings between the rods allow the juices dripping from the food during cooking to hit the griddle and be vaporized, creating rising smoke which flavors the food, closely simulating a charcoal-flavored food.

In order to provide distinctive patterns of scoring or branding on the food, the food supporting means may take several configurations such as those shown in FIG. 4. In one form a plurality of circular member 10a are connected together so that the circles will be branded on the food. In another form the letters W 10b are formed together to impart this particular brand on the food. Branding of the food in this way has a highly advantageous commercial aspect since the restaurant operator or caterer can develop a distinctive symbol and further his advertising by carrying the symbol onto the food being cooked.

While the preferred form of the invention has been illustrated and described, it should be understood that the invention is capable of modification and various equivalent forms will be readily apparent to one skilled in the art. Accordingly, the invention is not to be limited to the forms illustrated and described but to be construed as broadly as the claims dependent hereto may be fairly interpreted.

The embodiments of the invention in which a particular property or privilege is claimed are defined as follows:

1. A broiler attachment for use on a commercial-type cooking griddle having a large smooth imperforate surface comprising
a plurality of open ended food supporting rod means of heat conducting material engageable with said griddle surface substantially along the entire length of each rod means, said rod means being closely spaced to prevent the food from contacting the griddle surface and to provide a plurality of openings for allowing juices and the like to drip off the food being cooked onto the griddle surface and allow the smoke to reach substantially all of the food,
frame means for holding said food supporting rod means together as an integral unit, said frame means terminating above the lower surface of the rod means to permit the free flow of juices away from the rod means and to permit the food supporting rod means to rest directly on the griddle when in use whereby the food is scored by conduction through the food supporting rod means, and
handle means extending up from said frame means for moving the attachment.

2. The attachment of claim 1 wherein said food supporting rod means are in the form of distinct patterns for scoring the food in such distinct patterns.

3. The attachment of claim 1 wherein said frame means includes an elongated continuous frame rod secured to each said rod means.

4. The attachment of claim 3 wherein said frame rod is secured to the upper surfaces of said rod means.

5. A broiler attachment for use on a cooking griddle comprising
a plurality of food supporting rod means of heat conducting material spaced to provide a plurality of openings for allowing juices and the like to drip off the food being cooked and to allow the smoke to reach substantially all of the food, and
frame means for holding said food supporting rod means together as an integral unit, said frame means extending no lower than said food supporting rod means so that the food supporting rod means rest directly on the griddle when in use whereby the food is scored by conduction through the food supporting rod means,
the combination including an elevating rack having a plurality of arms, said arms engaging the frame means at one end of said attachment for raising the food supporting rod means above the griddle to slowly heat the food.

* * * * *